United States Patent [19]

Bellos

[11] 4,311,662
[45] Jan. 19, 1982

[54] CORROSION INHIBITOR FOR HIGHLY OXYGENATED SYSTEMS

[75] Inventor: Thomas J. Bellos, Kirkwood, Mo.

[73] Assignee: Petrolite Corporation, St. Louis, Mo.

[21] Appl. No.: 877,055

[22] Filed: Feb. 13, 1978

[51] Int. Cl.³ .............. C23F 11/04; C23F 11/06; C23F 11/12; C23F 11/16
[52] U.S. Cl. ........................ 422/12; 422/13; 422/15
[58] Field of Search .............. 21/2.7 A; 210/58; 166/244 C; 422/12, 13, 15; 252/8.55 B, 8.55 D, 8.55 E, 389 R, 389 A

[56] References Cited
U.S. PATENT DOCUMENTS

| | | |
|---|---|---|
| 3,502,587 | 3/1970 | Stanford et al. ............ 210/58 |
| 3,580,855 | 5/1971 | Mickus et al. ............. 252/181 |
| 3,714,066 | 1/1973 | King et al. ............... 210/58 |
| 3,728,419 | 4/1973 | Stanford et al. .......... 210/58 |
| 3,728,420 | 4/1973 | Stanford et al. .......... 210/58 |
| 3,793,194 | 2/1974 | Zecher .................. 210/58 |
| 4,014,814 | 3/1977 | Zecher .................. 21/2.7 A |

*Primary Examiner*—Bradley Garris
*Attorney, Agent, or Firm*—Sidney B. Ring; Hyman F. Glass

[57] ABSTRACT

This invention relates to the use of phosphorylated oxyalkylated polyols as corrosion inhibitors in highly oxygenated systems such as experienced in air drilling. These corrosion inhibitors not only inhibit general or overall corrosion but also inhibit localized corrosion of the pitting type.

5 Claims, No Drawings

CORROSION INHIBITOR FOR HIGHLY OXYGENATED SYSTEMS

Typically the two predominant methods of drilling gas, oil, and subterranean exploration holes in the earth's surface are performed by using a drilling apparatus that grinds away at the subterranean formations and by employing either a liquid or mud slurry as a vehicle to bring the cuttings from these subterranean formations to the surface and out of the way of the drilling apparatus which is generally a rotating bit being forced downward by the weight of the drilling pipe. In general terms a drilling apparatus is placed over the drilling location; a hole is drilled to a depth; a casing of steel is cemented in position through which the drilling apparatus will be lowered. Various safety devices are attached to this cemented casing which will direct the flow of any gas, oil, or water encountered during the drilling of the hole away from under the drilling rig. While this is an oversimplification of the actual process, it serves to demonstrate that a superstructure is first assembled on the drilling location prior to drilling a hole in the earth's surface for the purpose of finding gas, oil or further purpose of a geological survey, etc.

In general terms, drilling is accomplished using hollow thick walled steel pipe with a drilling bit attached at the leading end. By way of a rotary chuck the pipe is rotated causing the carbide tipped drilling bit to chip away at the subterranean formation. The weight of the tubing causes pressure on the bit which drives the drilling bit downward on an essentially vertical path into the subterranean formations.

In the "mist" or air drilling operation such as described in U.S. Pat. No. 3,130,798, air is blown down the hollow drilling tube where it exits through the drilling bit blowing the cutting produced by the drilling bit's path through the subterranean formations. This operation is called air drilling. During the course of drilling, subterranean water may be encountered. This water flows up the drilled hole and out a pipe that is attached to steel casing set at the surface of the hole. This pipe called a "blooey" line allows the drillings to travel up the drilled vertical hole where, at the surface, it exits beneath the rotary drilling table and out a horizontally mounted tube directing the cuttings, formation water, gas, oil, etc., into a pit dug for safety some thirty or forty feet from the drilling apparatus.

When subterranean water is encountered, unless it is gushing to the point where it flows from the hole, this tends to plug the drilling bit and stops the normal flow of solids from the hole. When water and/or oil is encountered or its presence is suspected, it is necessary to remove it from the hole and re-establish the normal flow of solids from the hole. During these intrusions of water and/or oil, a chemical "foaming" agent mixed in water is injected into the hole and the air passing through it creates a lathery foam in the hole. The foam is multifunctional. It helps remove the subterranean water, rock bits, cuttings during drilling and if the formation, e.g., shale, into which the bit is drilling has a tendency to collapse while being drilled, a "conditioner" may be added to lessen the likelihood of the collapse of the formation—a conditioner may be KCl solution (3–10%) which retards the swelling of the sensitive formation.

The use of water and/or a foamer is called "mist" drilling as the chips, etc. exit the hole blown from the depth as a "foamy mist."

When a mist operation is warranted, the use of a suitable water foamer produces in the presence of copious air (2,000–2,400 cfm), subterranean water which may be "briny" and therefore very corrosive. Under drilling conditions pressures may be generated in excess of 800 psi but more typically 125–400 psi. In some instances the formation into which the bit is drilling is so sensitive to water leaking in from various levels as the hole is drilled, that a saturated brine, e.g., Big Lakes Brine from West Texas which averages about 25% NaCl as well as some $MgCl_2$ and $CaCl_2$, is used to keep the hole from collapsing as it is drilled. This brine retards the hydration of the formation, e.g., Bentonite which swells in contact with water. The use of near saturated brine retards this swelling. In some instances, the drill may pass through a salt dome or formations of salts other than soluble salts.

Air drilling presents a very corrosive environment for the drilling pipe as it travels up the outside of the tubing with an abundance of air. Although water and air alone are immensely corrosive, the presence of a wetting agent (the foamer) and brine or salts dissolving from the formation as well as produced gases $CO_2$, $H_2S$ create an environment that if left unchecked may quickly destroy a drilling string of 5–20,000 feet costing as much as $500,000 at present prices.

We have discovered that phosphorylated oxyalkylated polyols are very effective as corrosion inhibitors in highly oxygenated systems such as experienced in air drilling. These corrosion inhibitors not only inhibit general or overall corrosion but also inhibit localized corrosion of the pitting type.

Although phosphylated polyols are known, for example as disclosed in the following U.S. Pat. Nos.:
3,502,587
3,580,855
3,728,420
3,793,194
4,014,814
they have not been employed in the manner of the present invention to achieve similar results, for example in their ability to inhibit both general or overall corrosion as well as localized corrosion of the pitting type.

The oxyalkylated polyols which are phosphorylated according to this invention are ideally represented by the following formula $$R[O(AO)_nH]_x$$

where R is an organic and preferably hydrocarbon moiety of the polyol, OA is the oxyalkylene moiety derived from an alkylene oxide, for example ethylene oxide, propylene oxide, butylene oxides, etc., and mixtures or block units thereof, n is the number of oxyalkylene units and x represents the total number of units containing OH groups.

Preferred polyols include glycerol, polyglycerol, trimethanolethane, pentaerythritol, dipentaerithrytol, etc., mannitol, 1, 2, 3 hexanetriol, etc.

A number of processes are known in the art for preparing the phosphorylated polyols. A preferred process is to react polyphosphoric acid with a polyol. The polyphosphoric acid should have a $P_2O_5$ (i.e., phosphorus pentoxide) content of at least about 72 percent, preferably about 82 percent to 84 percent. A residue of orthophosphoric acid and polyphosphoric acid remains on completion of the reaction. This residue may be as high as about 25%–40% of the total weight of the phosphorylated polyol. It may either be removed or left in admixture with the phosphorylated polyol. Preferably the phosphorylated polyols produced by this process are prepared employing amounts of a polyphosphoric acid having about 0.5–1 molar equivalents of $P_2O_5$ for each equivalent of the polyol used. Larger amounts of polyphosphoric acid can be used if desired. By "equivalent of the polyol" is meant the hydroxyl equivalents of the polyol. For example, one mole of glycerol is three equivalents thereof, one mole of pentaerythritol is four equivalents thereof, and so forth. The phosphorylated polyols (acid esters) can be partially or completely converted to their corresponding alkali metal salts or ammonium salts by reacting with appropriate basic material.

The compositions are polyfunctional acid phosphate esters of polyhydric alcohols, said esters having the formula $R(OPO_3H_2)_x$ wherein R is the hydrocarbyl group of a polyhydric alcohol (i.e., R is any remaining organic residue of a polyhydric alcohol used as the starting material) and x is a number from 2 to 6, said esters often being referred to in the art as phosphorylated polyols.

Also included within the definition of polyol are amine-containing polyols such as of the general formula above where R is amino-containing, for example tris(hydroxymethyl) aminomethane, 2-amino-2 ethyl-1,3-propanediol, triethanolamine, diethanolamine, etc.

The following examples are presented for purposes of illustration and not of limitation.

TABLE I

| Example | |
|---|---|
| 1 | 1 mole Pentaerythritol plus 4 moles EtO |
| 2 | 1 mole Pentaerythritol plus 5 moles EtO |
| 3 | 1 mole Pentaerythritol plus 6 moles EtO |
| 4 | 1 mole Pentaerythritol plus 7 moles EtO |
| 5 | 1 mole Pentaerythritol plus 8 moles EtO |
| 6 | 1 mole Glycerin plus 3 moles EtO |
| 7 | 1 mole Glycerin plus 4 moles EtO |
| 8 | 1 mole Glycerin plus 5 moles EtO |
| 9 | 1 mole Trimethylolpropane plus 3 moles EtO |
| 10 | 1 mole Trimethylolpropane plus 4 moles EtO |
| 11 | 1 mole Trimethylolpropane plus 5 moles EtO |

Typical phosphorylation is carried out as follows. Hydroxyl values are measured using typical analytical procedures. The products are next phosphorylated on an equivalent basis. For example, in Example 1, four equivalents of polyphosphoric acid (PPA) are used for each equivalent of hydroxyl group since the number of hydroxyl group per molecule in Example 1 is four. The moles of polyphosphoric acid can be calculated as follows:

$$1 \text{ gram mole} = \frac{142}{.82-0.84} = 169-173 \text{ grams.}$$

This calculation is obviously applied to polyphosphoric acid anhydride expressed as $P_2O_5$ corresponding to 82–84%. It may equally be applied to polyphosphoric acids of greater or less than those stated therefore typically for an 82% $P_2O_5$ polyphosphoric acid 169 g/mole $\times$ 4 would be a typical ratio with 313.4 g of Example 1 in Table I. The reaction can be run in such a fashion so as to get incremental additions of the PPA acid to the polyol. A 1:1 molar ratio is preferred but a 1 mole polyol to 1.3 moles PPA per hydroxyl produces a desirable product. Reaction conditions typically are 80°–110° C. (including one hour for the addition of the PPA) for 2 to 3 hours or more. The product is a viscous fluid.

To evaluate the products of invention, two methods were used, (1) at atmospheric pressure and (2) at superatmospheric pressure. In method (1) a vertical column was constructed with an air jet tube at the lower end and fluid injection part. At the top of the column a perpendicular exit tube directs the fluid into a disposal sump by way of a rubber tube. Mounted in the bottom of the vertical column is a probe of an electrochemical corrosion meter with test fluid. This corrosion meter described in U.S. Pat. No. 3,406,101 is manufactured and sold by Petrolite Corporation and is referred to as a "PAIR" meter, an abbreviation for "Polarization Admittance Instantaneous Rate."

The corrosion meter accurately measures corrosion rate in MPY (mils per year). The lower the value to zero the better the compound is as a corrosion inhibitor. In addition to the PAIR Meter readings the PAIR Probe is removed from their mounts, cleaned of corrosion product and weighed to determine their weight loss due to the attacks of the corrodant-oxygen. In addition, two Flush Mounted Probes (FMP) are installed in place of the conventional Probe. They measure corrosion rate except that their design is such that the individual electrodes which are vulnerable to physical damage by cuttings flowing from a drilling process, is avoided because the probe is set flush with the pipe instead of projecting into the interior of the pipe.

The results are presented in Table II.

TABLE II

| | Compound | PPM Conc. | pH Test Compound | Test Fluid | Submerged Bottom PAIR Electrodes*1 MPY averaged | PAIR Electrode*2 MPY | wt. loss | Foam Column Data FMP*3 MPY | FMP*3 MPY averaged | FMP*4 MPY | FMP*4 MPY averaged |
|---|---|---|---|---|---|---|---|---|---|---|---|
| (1) | Blank | — | — | 26% NaCl 1% Foamer | 6 MPY | 75 | 99 | | MPY averaged | 105 | MPY averaged |
| (2) | Example 1 (Table I) | 2500 | 2.0 | 26% NaCl 1% Foamer | 8 MPY | 22 | 27 | MPY | | 32 | MPY |
| (3) | Example 1 (Table I) | 2500 | 5.8 | 26% NaCl 1% Foamer | 4 MPY | 19 | 21 | 21 | | | MPY |
| (4) | Example 1 (Table I) | 2500 | 6.2 | 26% NaCl 1% Foamer | 4 MPY | 9 | 11 | MPY | | 12 | MPY |
| (5) | Example 1 (Table I) | 2500 | 6.7 | 26% NaCl 1% Foamer | 4 MPY | 7 | 8 | MPY | | 8.2 | MPY |
| (6) | Example 3 (Table I) | 2500 | 5.8 | 26% NaCl 1% Foamer | 5 MPY | 10 | 12 | MPY | | 13.8 | MPY |
| (7) | Example 3 (Table I) | 2500 | 6.5 | 26% NaCl 1% Foamer | 4 MPY | 9 | 10.8 | MPY | | 10.7 | MPY |
| (8) | Example 6 (Table I) | 2500 | 5.75 | 26% NaCl 1% Foamer | 6 MPY | 12 | 13 | MPY | | 14.1 | MPY |
| (9) | Example 6 (Table I) | 2500 | 6.55 | 26% NaCl 1% Foamer | 5 MPY | 10.6 | 11.2 | MPY | | 11.4 | MPY |
| (10) | Example 8 (Table I) | 2500 | 5.7 | 26% NaCl 1% Foamer | 6 MPY | 12 | 13.7 | MPY | | 14.3 | MPY |
| (11) | Example 8 (Table I) | 2500 | 6.74 | 26% NaCl 1% Foamer | 5 MPY | 11 | 11 | MPY | | 11.1 | MPY |
| (12) | Blank | — | — | 2% KCl 1% Foamer | 8 MPY | 82 | 100 | MPY | | 103 | MPY |
| (13) | Example 1 (Table I) | 2500 | 2.0 | 2% KCl 1% Foamer | 9 MPY | 21 | 29 | MPY | | 28 | MPY |
| (14) | Example 1 (Table I) | 2500 | 5.95 | 2% KCl 1% Foamer | 5 MPY | 17 | 19 | MPY | | 19.8 | MPY |
| (15) | Example 1 (Table I) | 2500 | 6.55 | 2% KCl 1% Foamer | 4 MPY | 8 | 10 | MPY | | 11.2 | MPY |
| (16) | Example 3 (Table I) | 2500 | 5.8 | 2% KCl 1% Foamer | 5 MPY | 11 | 11.8 | MPY | | 12.9 | MPY |
| (17) | Example 3 (Table I) | 2500 | 6.5 | 2% KCl 1% Foamer | 4 MPY | 9.0 | 10 | MPY | | 9.7 | MPY |
| (18) | Example 8 (Table I) | 2500 | 6.7 | 2% KCl 1% Foamer | 4 MPY | 7.1 | 8 | MPY | | 7.9 | MPY |
| (19) | Example 8 (Table I) | 2500 | 5.7 | 2% KCl 1% Foamer | 6 MPY | 11 | 11.8 | MPY | | 12.9 | MPY |
| (20) | Example 8 (Table I) | 2500 | 6.74 | 2% KCl 1% Foamer | 5 MPY | 10.1 | 9.8 | MPY | | 10.1 | MPY |

*1 Electrode mounted submerged in test fluid, conventional projecting probe
*2 Mounted in foam cleaned and weighed after test. FMP, flush mounted probe used with PAIR Meter.
*3 FMP, flush with surface of pipe.
*4 FMP, projected into pipe.

It was found that at pH below pH 6.0, the inhibitors were aggressive towards steel, that is, the pH was too low and the inhibitors actually attack the steel. The most ideal pH range was found to be pH 6.2–6.7 but pH 6.2–7.0 and 6.2–8.5 were acceptable.

A second method of evaluating the effectiveness of prospective inhibitors is under pressure. This is accomplished by charging the test solution containing inhibitor and foamer in a glass lined steel pressure vessel outfitted with a valved gas inlet tube, an outlet valve, a pressure gauge and the PAIR Electrode mounts on the inside of the vessel. Appropriate seals are used so that pressure doesn't leak out and around the electrodes. A magnetic stirring bar (Teflon coated) is placed in the pressure vessel and the apparatus is placed on a magnetic stirring apparatus. The vessel is charged with air or oxygen and stirring is commenced and PAIR measurements are made. At the completion of the test, the electrodes are cleaned and weighed and the PAIR instrument data is compared against the weight loss data. This is accomplished by calculating the weight loss vs. the length of the test. Table III contains data typical of the products of invention. The Potentiodyne method of determining MPY pitting corrosion ($MPY_P$) is described by R. L. Martin in Paper No. 10 presented at NACE CORROSION/77 in San Francisco, Calif. (1977).

The technique for the evaluation of pit propagation rate using a potentiodyne analyzer is: first, cathodically polarize an electrode which has been equilibrated in the system. Next, make an anodic scan on a second equilibrated electrode, reversing the scan direction as high total current is reached. If the anodic scan exhibits positive hysteresis, the intersection of the anodic backscan and the cathodic scan is a current density which is proportional to the pitting rate in the system at the time of the test. The direct proportionality between this current density and the pitting rate is obtained for each individual system by visual examination of the relative pitted and unpitted areas of the anodic test electrode.

Pits are usually initiated at the beginning of the test in an uninhibited system. They then proprogate at the same rate yielding similar current densities and surface areas, the magnitude depending on the metal and its environment. The resulting pitting rate distribution curve is approximately symmetrical and the centroid of the distribution corresponds well with the potentiodyne value.

The presence of a corrosion inhibitor complicates the analysis in that the inhibitor may affect both pit nucleation and growth rate. Pits can, therefore, nucleate many times and grow at different rates until protection develops. Since the potentiodyne-determined pitting rate is a weighted average, either of these two factors would lead to a skewed distribution.

The pitting rate data obtained in the field using this potentiodyne technique correlate well with visual analysis of pitted specimens in the laboratory. Based on the results obtained in laboratory studies and those obtained in actual cooling water systems, one can evaluate the pitting severity of a system as well as the effectiveness of a corrosion inhibition program with a high degree of confidence.

TABLE III

Pressure Vessel Test Data

| | Compound | PPM Conc. | pH | Test Fluid | PAIR Meter Corrosion Measurement 24 hrs. | | Coupon Wt. Loss Data | | Pressure Gas (Air) | Potentiodyne ®* Pit Rates | |
|---|---|---|---|---|---|---|---|---|---|---|---|
| (1) | Example 1 (Table I) | 2500 | 6.5 | 2% CaCl$_2$ 25% NaCl 2% Foamer | 3.4 | MPY average | 2.99 | MPY | 200 psig | 47.5 | MPY |
| (2) | Example 6 (Table I) | 2500 | 6.5 | 2% CaCl$_2$ 25% NaCl 1% Foamer | 7.3 | MPY average | 4.2 | MPY | 200 psig | 50.0 | MPY |
| (3) | Example 8 (Table I) | 2500 | 6.5 | 2% CaCl$_2$ 25% NaCl 1% Foamer | 8.2 | MPY | 4.8 | MPY | 200 psig | 52 | MPY |
| (4) | Blank | — | — | 2% CaCl$_2$ 25% NaCl 1% Foamer | 150 | MPY | 120 | MPY | 200 psig | 330 | MPY |
| (5) | Blank | — | — | 2% KCl 1% Foamer | 162 | MPY | 124 | MPY | 200 psig | 350 | MPY |
| (6) | Example 1 (Table I) | 2500 | 6.7 | 2% KCl 1% Foamer | 3 | MPY | 2.9 | MPY | 200 psig | 46.5 | MPY |
| (7) | Example 8 (Table I) | 2500 | 6.65 | 2% KCl 1% Foamer | 10 | MPY | 8.9 | MPY | 200 psig | 52.6 | MPY |
| (8) | Example 1 (Table I) | 1000 | 6.5 | 2% CaCl$_2$ 24% NaCl | 78 | MPY | 66 | MPY | 200 psig | 250 | MPY |
| (9) | Example 1 (Table I) | 1800 | 6.5 | 2% CaCl$_2$ 24% NaCl | 56 | MPY | 60 | MPY | 200 psig | 210 | MPY |
| (10) | Example 1 (Table I) | 2000 | 6.5 | 2% CaCl$_2$ 24% NaCl | 22 | MPY | 31 | MPY | 200 psig | 178 | MPY |
| (11) | Example 6 (Table I) | 2000 | 6.5 | 2% CaCl$_2$ 25% NaCl | 6.4 | MPY | 5.1 | MPY | 200 psig | 64.0 | MPY |
| (12) | Example 6 (Table I) | 2500 | 6.5 | 2% CaCl$_2$ 25% NaCl | 6.0 | MPY | 4.9 | MPY | 200 psig | 69.5 | MPY |
| (13) | Example 9 (Table I) | 2000 | 6.5 | 2% CaCl$_2$ 25% NaCl | 5.8 | MPY | 4.8 | MPY | 200 psig | 52.4 | MPY |
| (14) | Example 9 (Table I) | 2500 | 6.5 | 2% CaCl$_2$ 25% NaCl | 4.8 | MPY | 4.0 | MPY | 200 psig | 50.0 | MPY |
| (15) | Example 6 (Table I) | 1800 | 6.5 | 2% CaCl$_2$ 25% NaCl | 54.0 | MPY | 58.0 | MPY | 200 psig | 198 | MPY |
| (16) | Example 9 (Table I) | 1800 | 6.5 | 2% CaCl$_2$ 25% NaCl | 59.0 | MPY | 57.0 | MPY | 200 psig | 179 | MPY |
| (17) | Example 1 | | | 2% CaCl$_2$ | | | | | | | |

TABLE III-continued

| | Compound | PPM Conc. | pH | Test Fluid | PAIR Meter Corrosion Measurement 24 hrs. | | Coupon Wt. Loss Data | | Pressure Gas (Air) | Potentiodyne ®* Pit Rates | |
|---|---|---|---|---|---|---|---|---|---|---|---|
| | | | | | \multicolumn{6}{c}{Pressure Vessel Test Data} | | | | |
| | (Table I) | 2500 | 8.2 | 25% NaCl 2% CaCl$_2$ | 25.0 | MPY | 18.0 | MPY | 200 psig | 180 | MPY |
| (18) | Example 1 (Table I) | 500 | 6.4 | 25% NaCl | 80.5 | MPY | 76.0 | MPY | 200 psig | 278 | MPY |

*Potentiodyne ® is described in U.S.P. 3,855,101
Dyamic Analyzer
Corrosion Meter In Table III Potentiodyne scans were carried out. This instrument measures the pitting behavior of a solution of electrolytes on ferrous alloys. The difference between the blank rate and the inhibited rate represents the percent protection. For example, in Table III, Example 1 has an inhibited pitting rate of 47.5 in contrast to Example 4 which has an uninhibited pitting rate of 330; similarly Example 6 has an inhibited pitting rate of 46.5 in contrast to Example 5 which has a pitting rate of 350.

In summary, this invention relates to the use as corrosion inhibitor in highly oxygenated systems of phosphorylated polyols oxyalkylated with about 1 to 20 or more moles of alkylene oxide, preferably ethylene oxide, per mole of polyol, the polyol having at least three hydroxyl group such as 3–10 hydroxyl group, for example 3–6 but preferably 4–5. The oxyalkylated polyol is phosphorylated with about 0.5 to 2.0 moles of polyphosphoric acid per hydroxyl group, such as from about 0.6 to 1.5, but preferably about 1–1.3 moles. The phosphorylated oxyalkylated polyol is generally employed as a salt, such as an alkali metal salt, an ammonium or amine salt, for example as sodium, potassium, ammonium, alkanolamine salts, such as mono-, di-, or tri-ethanolamine salts, etc.

These phosphorylated oxyalkylated polyols are employed in the oxygenated systems at a pH of from about 5.0 to 8.5, such as from 6.0 to 8.0, but preferably from about 6.5 to 6.7.

The phosphorylated oxyalkylated polyols are employed in concentrations of at least about 1500 ppm, such as from about 1500 to 5000 ppm or more, for example about 2000 to 4000 ppm, but preferably from about 2000 to 3000 ppm, these amounts being effective to inhibit corrosion.

I claim:

1. A process of inhibiting both general and pitting corrosion of ferrous alloys in a highly oxygenated corrosive system which comprises adding to said highly oxygenated corrosive system a minor amount, effective to inhibit corrosion, of phosphorylated oxyalkylated polyol at a pH of 5.0 or higher.

2. The process of claim 1 where the phosphorylated oxyalkylated polyol is employed in a concentration of at least about 1500 ppm at a pH of from 6.0 to 8.5 and said oxyalkylated polyol is an oxyethylated polyol.

3. The process of claim 2 where the polyol is selected from the group consisting of glycerol, pentaerythritol and trimethylol propane.

4. The process of claim 1 where the phosphorylated oxyalkylated polyol is employed in a concentration of at least about 1500 ppm at a pH of from 6.0 to 8.5.

5. The process of claim 4 where the phosphorylated oxyalkylated polyol is employed in the form of alkali metal, ammonium or amine salts.

* * * * *

UNITED STATES PATENT AND TRADEMARK OFFICE
CERTIFICATE OF CORRECTION

PATENT NO. : 4,311,662
DATED : January 19, 1982
INVENTOR(S) : Thomas J. Bellos

It is certified that error appears in the above—identified patent and that said Letters Patent is hereby corrected as shown below:

Col. 5 and 6: The last three columns of item 3 in Table II should read

---     MPY     21     MPY     ---.

Signed and Sealed this

Seventh Day of June 1983

[SEAL]

*Attest:*

DONALD J. QUIGG

*Attesting Officer*     *Acting Commissioner of Patents and Trademarks*